US012181957B2

(12) United States Patent
Wang et al.

(10) Patent No.: US 12,181,957 B2
(45) Date of Patent: Dec. 31, 2024

(54) METHOD, ELECTRONIC DEVICE, AND COMPUTER PROGRAM PRODUCT FOR GENERATING LOGS

(71) Applicant: Dell Products L.P., Round Rock, TX (US)

(72) Inventors: Zijia Wang, Weifang (CN); Zhisong Liu, Shenzhen (CN); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 89 days.

(21) Appl. No.: 18/129,481

(22) Filed: Mar. 31, 2023

(65) Prior Publication Data

US 2024/0289199 A1 Aug. 29, 2024

(30) Foreign Application Priority Data

Feb. 28, 2023 (CN) .......................... 202310200545.6

(51) Int. Cl.
G06F 11/07 (2006.01)

(52) U.S. Cl.
CPC ...... G06F 11/0784 (2013.01); G06F 11/0787 (2013.01)

(58) Field of Classification Search
CPC .................. G06F 11/0784; G06F 11/0787
See application file for complete search history.

(56) References Cited

U.S. PATENT DOCUMENTS

| 10,810,055 | B1 * | 10/2020 | Walker | G06F 16/2358 |
|---|---|---|---|---|
| 11,368,307 | B1 * | 6/2022 | Ozarkar | H04L 9/3218 |
| 11,681,747 | B2 * | 6/2023 | Vartakavi | G06F 16/686 |
| | | | | 707/734 |
| 2011/0174541 | A1 * | 7/2011 | Strachan | E21B 44/00 |
| | | | | 702/9 |
| 2014/0298034 | A1 * | 10/2014 | Watanabe | H04L 9/3247 |
| | | | | 713/176 |

(Continued)

OTHER PUBLICATIONS

A. Oliner et al., "What Supercomputers Say: A Study of Five System Logs," 37th Annual IEEE/IFIP International Conference on Dependable Systems and Networks, Jun. 2007, 10 pages.

(Continued)

*Primary Examiner* — Kamini B Patel
(74) *Attorney, Agent, or Firm* — Ryan, Mason & Lewis, LLP

(57) ABSTRACT

Embodiments of the present disclosure provide a method, an electronic device, and a computer program product for generating logs. The method comprises: generating, by a generator, a pseudo-log based on a generating condition and random noise; determining, by a discriminator, event types of log messages in a real log and the pseudo-log; determining, by the discriminator, a feature matrix of log sequences in the real log and the pseudo-log based on the event types; determining, by the discriminator, authenticity of the real log and the pseudo-log based on the feature matrix; and training the generator and the discriminator based on the authenticity. The method according to embodiments of the present disclosure may improve the accuracy of a training model for generating pseudo-logs that are sufficiently real.

20 Claims, 9 Drawing Sheets

(56) References Cited

U.S. PATENT DOCUMENTS

| | | | | |
|---|---|---|---|---|
| 2016/0219067 A1* | 7/2016 | Han | .................... | H04L 63/1425 |
| 2016/0248803 A1* | 8/2016 | O'Connell | ........ | G06F 16/24575 |
| 2020/0183047 A1* | 6/2020 | Denli | ..................... | G01V 20/00 |
| 2021/0306324 A1* | 9/2021 | Ito | ....................... | H04L 63/0815 |
| 2021/0396903 A1* | 12/2021 | Bayraktar | ............... | E21B 49/00 |
| 2021/0397972 A1* | 12/2021 | Walters | .................. | G06N 3/047 |
| 2022/0055211 A1* | 2/2022 | Wang | ....................... | B25J 9/163 |
| 2022/0205798 A1* | 6/2022 | Rivella | ................ | H04N 21/251 |
| 2023/0296801 A1* | 9/2023 | Song | ..................... | G06N 5/025 |
| | | | | 702/6 |
| 2023/0333968 A1* | 10/2023 | Wang | .................. | G06F 11/3684 |

OTHER PUBLICATIONS

P. He et al., "Drain: An Online Log Parsing Approach with Fixed Depth Tree," IEEE 24th International Conference on Web Services, Jun. 2017, pp. 33-40.

M. Mirza et al., "Conditional Generative Adversarial Nets," arXiv:1411.1784v1, Nov. 6, 2014, 7 pages.

J. Wang et al., "LogEvent2vec: LogEvent-to-Vector Based Anomaly Detection for Large-Scale Logs in Internet of Things," Sensors, vol. 20, No. 9, Apr. 26, 2020, 19 pages.

\* cited by examiner

METHOD, ELECTRONIC DEVICE, AND COMPUTER PROGRAM PRODUCT FOR GENERATING LOGS

RELATED APPLICATION

The present application claims priority to Chinese Patent Application No. 2023 10200545.6, filed Feb. 28, 2023, and entitled "Method, Electronic Device, and Computer Program Product for Generating Logs," which is incorporated by reference herein in its entirety.

FIELD

Embodiments of the present disclosure relate to the field of computer technologies, and more specifically to a method, an electronic device, and a computer program product for generating logs.

BACKGROUND

Logs may be used for recording the state and event occurrence of devices and systems. In academic research and industrial applications, large amounts of log data collected from devices and systems may be analyzed to identify user behavior patterns or find out system faults. Therefore, log exception detection is an important source of information for device or system management, inspection of operation, and troubleshooting.

However, in some cases, due to the limitation that the number of log data sets is small, deviations in applications involving logs may be caused. For example, a very small number of exception logs in the log data sets may be omitted. As another example, when a large number of logs are required, there may not be a sufficient number of real logs available to support the use requirements.

SUMMARY

According to the example embodiments of the present disclosure, a technical solution for generating logs is provided for rapidly expanding the number of logs under specified conditions.

In a first aspect of the present disclosure, a method for generating logs is provided, the method including: generating, by a generator, a pseudo-log based on a generating condition and random noise; determining, by a discriminator, event types of log messages in a real log and the pseudo-log; determining, by the discriminator, a feature matrix of log sequences in the real log and the pseudo-log based on the event types; determining, by the discriminator, authenticity of the real log and the pseudo-log based on the feature matrix; and training the generator and the discriminator based on the authenticity. Implementation of the method according to the first aspect may improve the accuracy of a training model for generating pseudo-logs that are sufficiently real.

In a second aspect of the present disclosure, an electronic device for generating logs is provided. The electronic device includes: a processor; and a memory coupled to the processor and having instructions stored therein, wherein the instructions, when executed by the processor, cause the electronic device to perform operations including: generating, by a generator, a pseudo-log based on a generating condition and random noise; determining, by a discriminator, event types of log messages in a real log and the pseudo-log; determining, by the discriminator, a feature matrix of log sequences in the real log and the pseudo-log based on the event types; determining, by the discriminator, authenticity of the real log and the pseudo-log based on the feature matrix; and training the generator and the discriminator based on the authenticity. Implementation of the electronic device according to the second aspect may improve the accuracy of a training model for generating pseudo-logs that are sufficiently real.

In a third aspect of the present disclosure, a computer program product is provided, the computer program product being tangibly stored in a non-transitory computer-readable medium and including machine-executable instructions, wherein the machine-executable instructions, when executed by a machine, cause the machine to perform the method according to the first aspect of the present disclosure.

In a fourth aspect of the present disclosure, a computer-readable storage medium having a computer program stored thereon is provided, wherein the computer program, when executed by a device, causes the device to perform the method according to the first aspect of the present disclosure.

From the above description, the solution according to embodiments of the present disclosure may improve the accuracy of a training model for generating pseudo-logs that are sufficiently real, and then may rapidly expand the log volume under specified conditions by use of the model.

It should be understood that this Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which.

DETAILED DESCRIPTION

Figure 1:
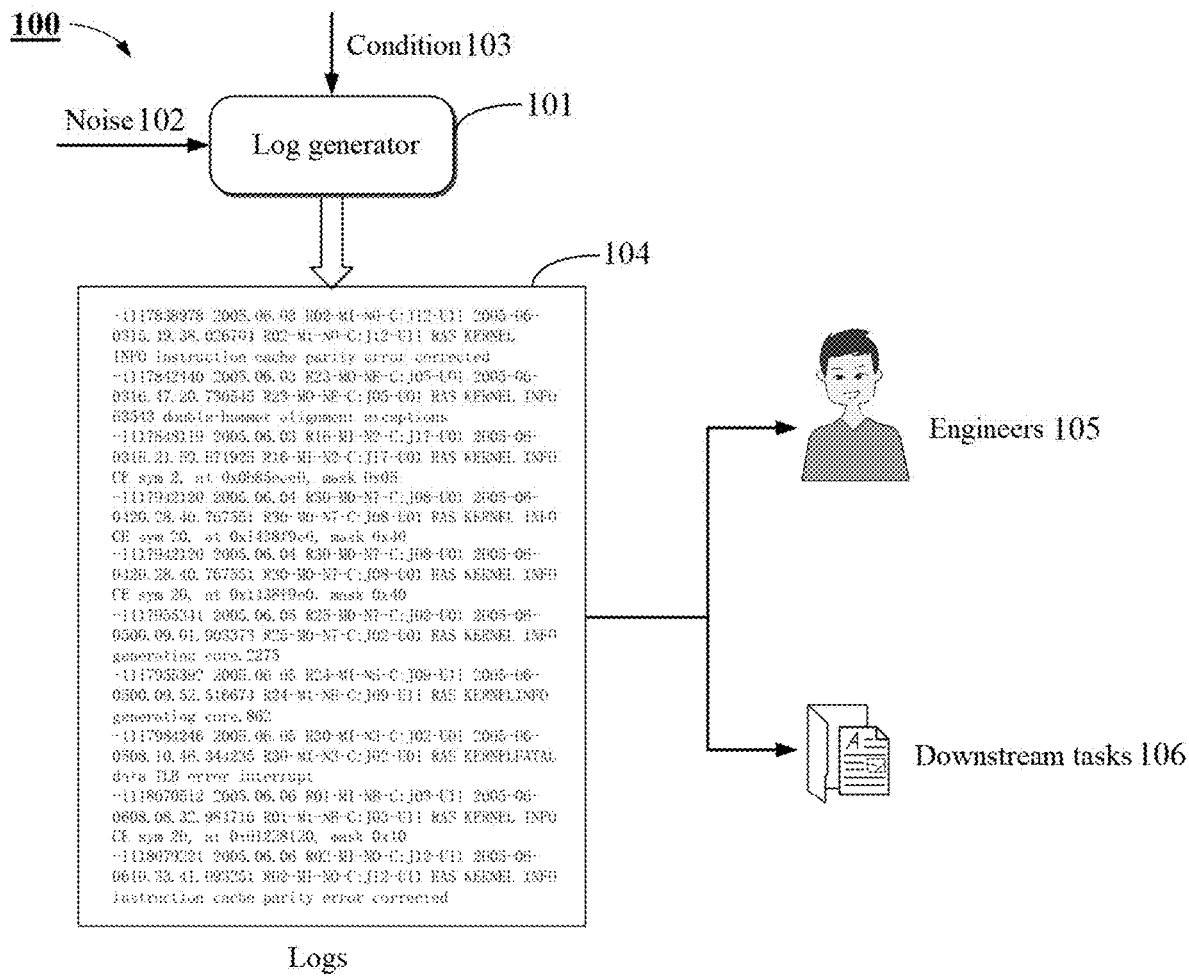
FIG. 1 shows a schematic diagram of an application scenario according to some embodiments of the present disclosure.

Illustrative embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

Logs are used for recording the state and event occurrence of devices and systems, and may help device or system management, inspection of operation, and troubleshooting. For example, devices with data collection functionality deployed in an Internet of Things (IoT) system may collect sensor data in real time and continuously provide the data to the system. These devices are vulnerable to the impact of the environment, so the devices can be monitored by checking and analyzing log messages to find out an abnormal state caused by sensor hardware failure, energy depletion, or the environment, thereby ensuring the safety and reliability of the devices. Based on the analysis of logs, the solution of an IoT system may also be updated and improved.

In an application scenario that requires a large amount of log data, if the number of real log data is too small to support use requirements, the framework and method for enhancing a log event data set provided in the present disclosure may be used for generating a large number of pseudo-log data that is sufficiently real to meet the use requirements, e.g., the generated logs may be used for training of new engineers or downstream tasks.

Some of the embodiments of the present disclosure provide a method, an electronic device, and a computer program product for generating logs. The method includes: generating, by a generator, a pseudo-log based on a generating condition and random noise; determining, by a discriminator, event types of log messages in a real log and the pseudo-log; determining, by the discriminator, a feature matrix of log sequences in the real log and the pseudo-log based on the event types; determining, by the discriminator, authenticity of the real log and the pseudo-log based on the feature matrix; and training the generator and the discriminator based on the authenticity.

Implementation of the method provided by the present disclosure may improve the accuracy of a training model for generating pseudo-logs that are sufficiently real, and then may rapidly expand a log data set under specified conditions by use of the model. Moreover, the generated logs have excellent authenticity.

FIG. 1 shows a schematic diagram of application scenario 100 according to some embodiments of the present disclosure. Application scenario 100 is a schematic diagram of generation and application of logs. As shown in FIG. 1, in a case that the number of required log data exceeds the number of existing log data, log generator 101 may generate a large number of logs 104 that are sufficiently real based on inputted noise 102 to expand a log data set, and then the data set of the generated logs 104 may be provided for engineers 105 and downstream tasks 106. In some implementations, one or more conditions may be added during training of the log generator 101, such that when log generator 101 is used for generating logs, with condition 103 inputted, log generator 101 may output log data that meets condition 103.

Some embodiments of the present disclosure provide systems for generating logs and methods for training a log generator, which may generate sufficiently real log data and rapidly expand a log data set. For specific example implementations, please refer to the following embodiments.

Figure 2:
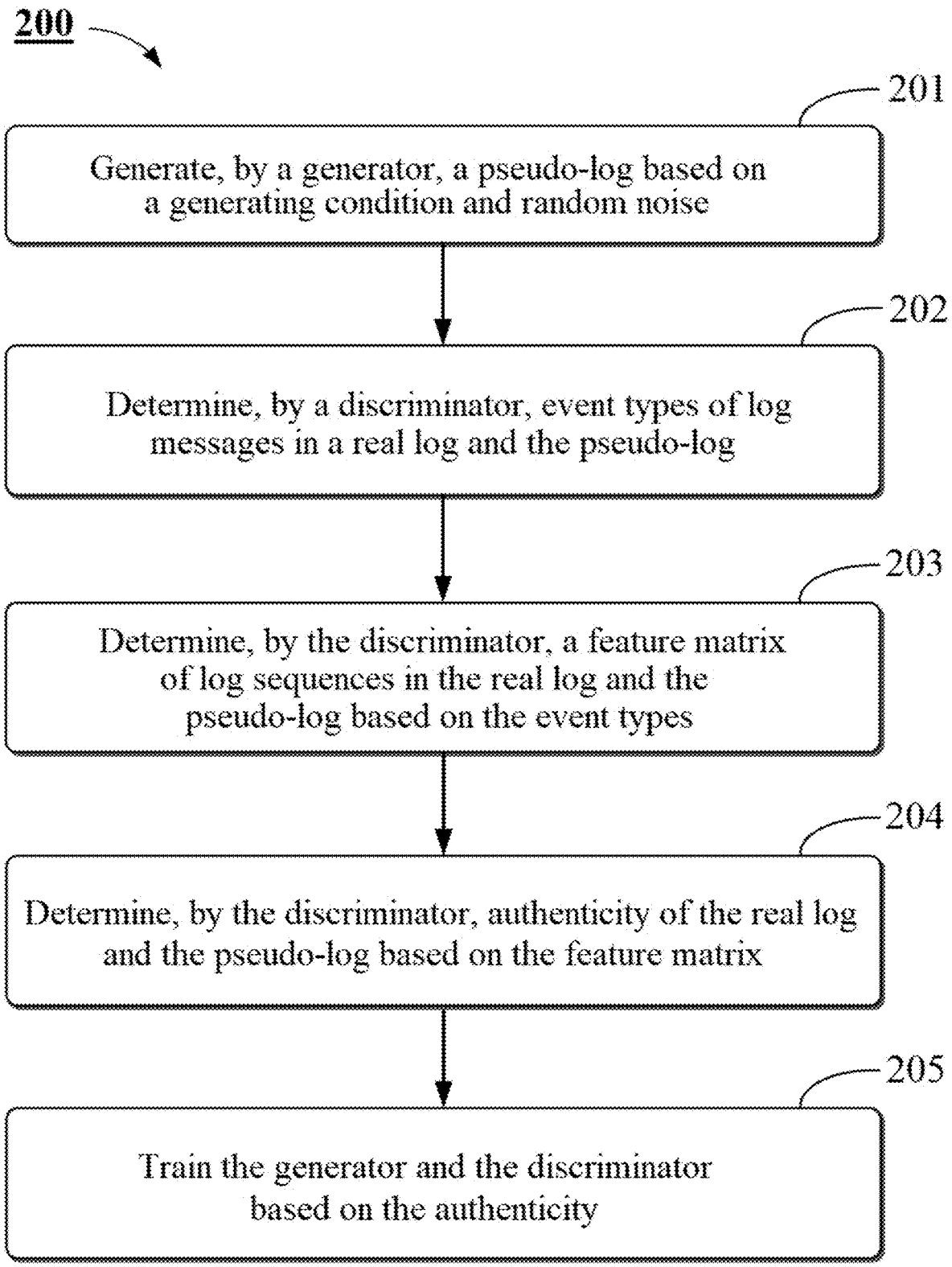
FIG. 2 shows a flow chart of a method for generating logs according to some embodiments of the present disclosure.

FIG. 2 shows a flow chart of method 200 according to some embodiments of the present disclosure. Method 200 may be performed by electronic devices. The electronic devices may include, but are not limited to, personal computers (PCs), server computers, handheld or laptop devices, mobile terminals, multiprocessor systems, or combinations thereof. Embodiments of the present disclosure do not make any limitation to the device type and the like of the electronic device that implements method 200. It should be understood that, in embodiments of the present disclosure, the subject implementing method 200 may be implemented by an entity device or may be implemented by a plurality of entity devices together. It is to be understood that the subject implementing method 200 may be a logical function module in an entity device, or may be a logical function module composed of a plurality of entity devices. It should also be understood that, in the following embodiments of the present disclosure, the steps in the method provided in embodiments of the present disclosure may be performed by one entity device, or the steps in the method provided in embodiments of the present disclosure may be performed by a plurality of entity devices cooperatively, which is not limited in embodiments of the present disclosure. It should be further understood that method 200 may also include additional blocks that are not shown and/or may omit blocks that are shown, and the scope of the present disclosure is not limited in this regard.

The operations performed in the method 200 are as follows. In block 201, generate, by a generator, a pseudo-log based on a generating condition and random noise. In block 202, determine, by a discriminator, event types of log messages in a real log and the pseudo-log. In block 203, determine, by the discriminator, a feature matrix of log sequences in the real log and the pseudo-log based on the event types. In block 204, determine, by the discriminator, authenticity of the real log and the pseudo-log based on the feature matrix. In block 205, train the generator and the discriminator based on the authenticity. Implementation of method 200 may improve the accuracy of a training model for generating pseudo-logs that are sufficiently real, and then may rapidly expand a log data set under specified conditions by use of the model. Moreover, the generated logs have excellent authenticity.

Figure 3:
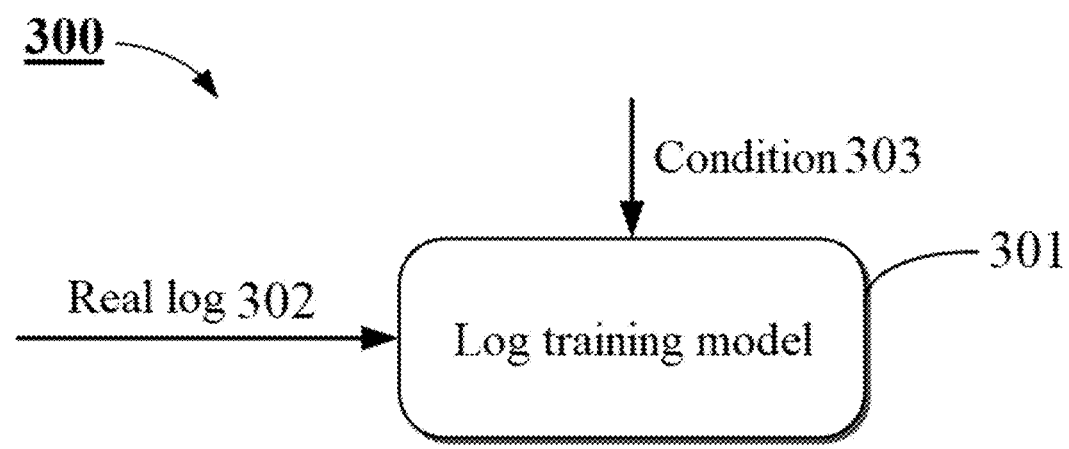
FIG. 3 shows a schematic diagram of a framework for log training according to some embodiments of the present disclosure.

As described above, method 200 provides a training process of a log generation model. Referring to FIG. 3, a framework 300 for log training is shown. In the log training framework 300, data of real log 302 and condition 303 may be inputted into log training model 301 for training. The trained model may be used for log generation. In some embodiments, generative adversarial networks (GANs) may be used as log training model 301. Further, conditional generative adversarial networks (CGANs) may also be used for generating targeted log data under conditions. Embodiments of the present disclosure do not limit the specific model type and specific training process of the training model, and those that may realize the ideas of the present disclosure are within the scope of protection of the present disclosure. For the process and architecture of training logs using GAN or CGAN models, please refer to the embodiments shown in FIG. 4 to FIG. 9.

Figure 4:
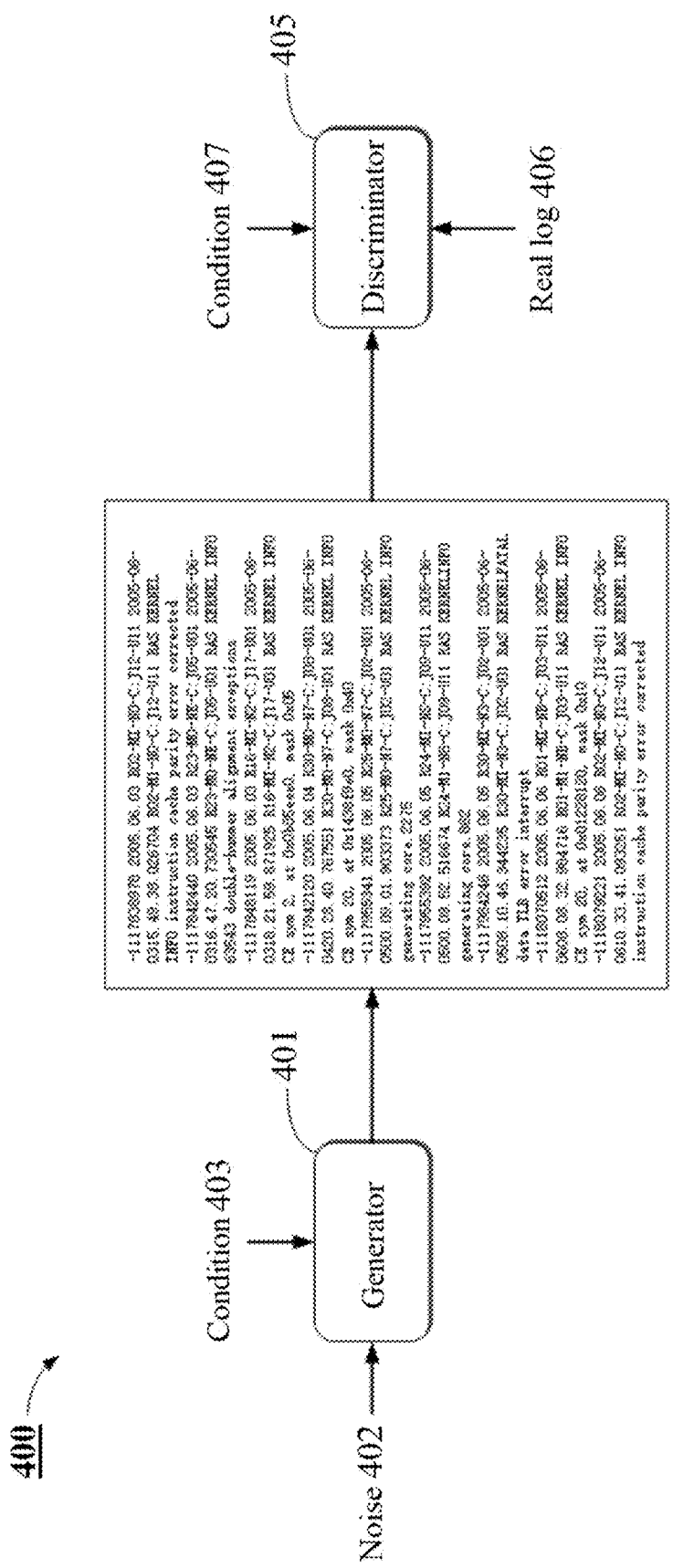
FIG. 4 shows a schematic diagram of an architecture of a log training model according to some embodiments of the present disclosure.

FIG. 4 shows architecture 400 of a log training model. In this implementation, logs may be trained by using a CGAN model. As illustrated in the figure, architecture 400 includes generator 401 and discriminator 405. In combination with method 200, in some embodiments, pseudo-logs 404 may be generated by generator 401 based on generating condition 403 and random noise 402. Pseudo-logs 404, real log 406, and generating condition 407 are inputted into discriminator 405, and discriminator 405 determines the authenticity of the real log and the pseudo-log. Generator 401 and discriminator 405 are trained based on the judgment of authenticity. The generator or discriminator may be a convolutional neural network model, a circular neural network model, a fully connected neural network model, and the like, which is not limited in the present disclosure.

In a GAN model, generator 401 is configured to capture data distribution, and discriminator 405 is configured to estimate the probability that a sample comes from real training data rather than from generator 401. Both generator 401 and discriminator 405 may be nonlinear mapping functions, e.g., multilayer perceptron. In order to learn generator distribution $p_g$ on data x, generator G constructs a mapping function $G(z; \theta_g)$ from prior noise distribution $p_z(z)$ to data space. Discriminator $D(x; \theta_d)$ outputs a single scalar, which represents the probability that x comes from training data rather than from $p_g$. Generator G and discriminator D may be trained at the same time, e.g., the parameters of G are adjusted to minimize log (1−D(G(z))), and parameter D is adjusted to minimize log D(x). An objective function V (G, D) of a corresponding two-player minimax game is shown in Equation (1):

$$\min_G \max_D V(D, G) = \mathbb{E}_{x \sim p_{data}(x)}[\log D(x)] + \mathbb{E}_{z \sim p_z(z)}[\log(1 - D(G(z)))] \quad (1)$$

The generative adversarial network may be extended to a conditional model, if generator G and discriminator D are under a condition of some additional information y, where y may be any type of auxiliary information, e.g., class labels or data from other modalities (such as audio or text information). Adjustment may be performed by simultaneously inputting y into discriminator D and generator G as an additional input layer. In generator G, prior input noise $p_z(z)$ and y are combined in joint hidden representation, and an adversarial training framework allows considerable flexibility in how to compose hidden representation. In discriminator D, x and y are represented as inputs of a discriminant function, and the objective function V (G, D) of the corresponding two-player minimax game is shown in Equation (2):

$$\min_G \max_D V(D, G) = \quad (2)$$
$$\mathbb{E}_{x \sim p_{data}(x)}[\log D(x \mid y)] + \mathbb{E}_{z \sim p_z(z)}[\log (1 - D(G(z \mid y)))]$$

In combination with method 200, in some embodiments, the process of training generator 401 and discriminator 405 may include first fixing discriminator 405, training generator 401 based on random noise 402 and generating condition 403, and then generating pseudo-logs 404 based on random noise 402 and generating condition 403 by trained generator 401. Then, pseudo-logs 404 generated by generator 401 are inputted into discriminator 405. Then, generator 401 is fixed, and discriminator 405 is trained based on pseudo-logs 404, real log 406, and generating condition 407.

In combination with method 200, in some embodiments of the present disclosure, discriminator 405 may output discrimination probability based on judging whether the inputted pseudo-log is a real log under the corresponding generation condition. Then, a loss is obtained according to the discrimination probability. Discriminator 405 and/or generator 401 is "punished" or otherwise adjusted according to the loss. Discriminator 405 and generator 401 adjust the parameters according to the loss to obtain a more accurate training model.

In combination with method 200, in some embodiments, training may be stopped when the discrimination probability meets a predetermined value. In some embodiments, in a case that the predetermined value is 0.5, it is indicated that discriminator 405 cannot distinguish the authenticity of the pseudo-log generated by generator 401 and the real log. At this time, it is indicated that generator 401 has been able to generate pseudo-log data that is sufficiently real.

In some embodiments, after the model has been trained, the trained generator may be used as log generator 101. A target condition and random noise are inputted into the trained generator, and the trained generator generates the log corresponding to the target condition. Then, the log data is provided to downstream tasks or engineers, as described in FIG. 1.

Figure 5:
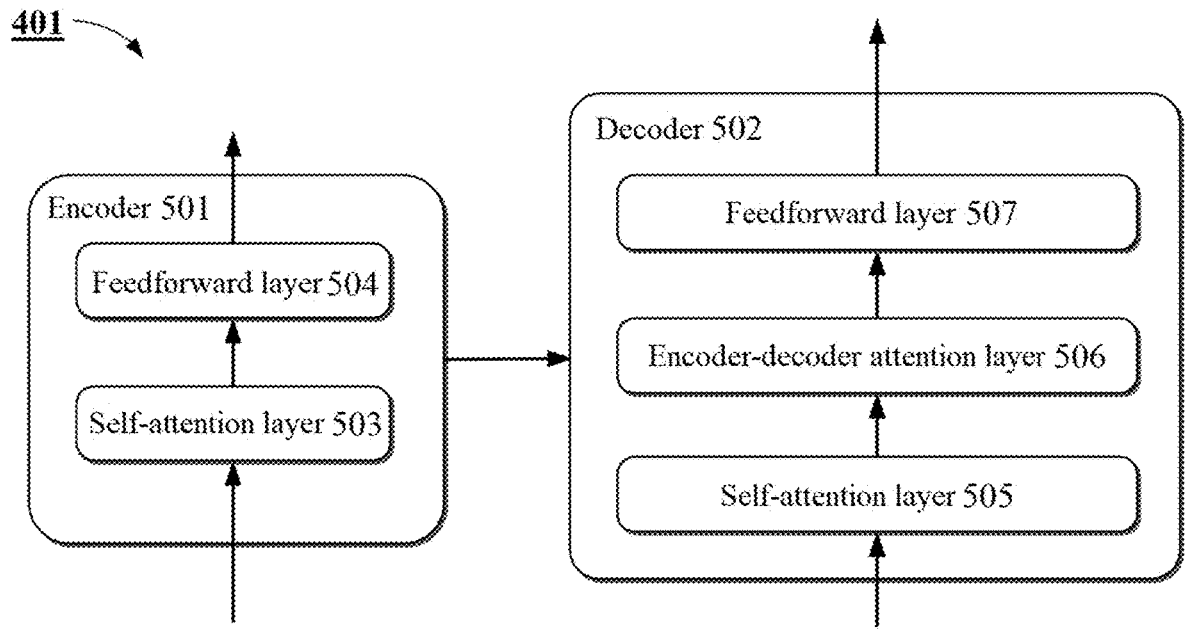
FIG. 5 shows a schematic diagram of the structure of a generator according to some embodiments of the present disclosure.

FIG. 5 shows the structure of generator 401 in some embodiments of the present disclosure. In this example, generator 401 may include encoder 501 and decoder 502. The encoder-decoder structure may be configured to reconstruct a log sequence and convert noise into qualified log data. Encoder 501 may include self-attention layer 503, feedforward layer 504, and the like. Decoder 502 may include self-attention layer 505, encoder-decoder attention layer 506, feedforward layer 507, and the like. Noise data is inputted into encoder 501 and passes through each layer of a neural network, and finally the generated log data is outputted by decoder 502.

Figure 6:
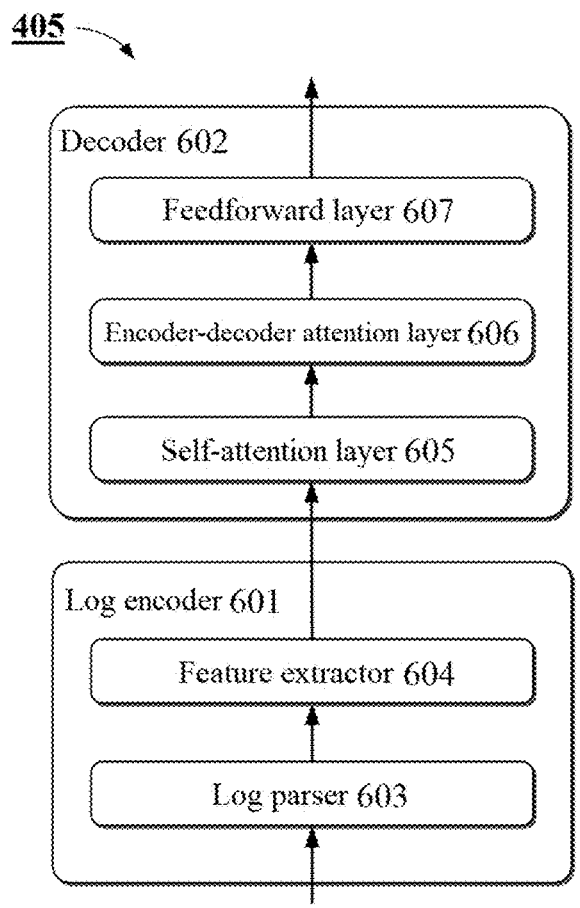
FIG. 6 shows a schematic diagram of the structure of a discriminator according to some embodiments of the present disclosure.

FIG. 6 shows the structure of discriminator 405 in some embodiments of the present disclosure. In this example, discriminator 405 may include log encoder 601 and decoder 602. Log encoder 601 is configured to perform pre-training using a pre-training strategy specially designed for log events before the GAN training process. Log encoder 601 may include log parser 603, feature extractor 604, and the like. Decoder 602 may include self-attention layer 605, encoder-decoder attention layer 606, feedforward layer 607, and the like. Log data is inputted into log encoder 601 and passes through each layer of the neural network, and finally discrimination probability and loss are outputted by decoder 602. The discriminator and/or generator may adjust the parameters in the model according to back propagation of the discrimination probability and the loss to further improve the accuracy of the training model.

In combination with the above embodiments, in some embodiments, each log message may be parsed by the discriminator to obtain the event type corresponding to each log message, and then the discriminator maps each log message to the corresponding event type thereof. In combination with the above embodiments, in some embodiments, the discriminator determines a feature matrix of log sequences in the real log and the pseudo-log based on the event type. Specifically, the discriminator may construct the log sequences according to the event types corresponding to a plurality of log messages and a preset window, and then determine the feature matrix of the log sequences according to the log sequences. Then, the feature matrix of the log sequences is used as the input of the model for the subsequent training process.

Logs are semi-structured text data and are different from classification and detection in computer vision, digital time series, and graphic data. At present, a standard method for processing exception logs is inefficient. Operators usually use regular expression matching or keyword search (e.g., "failure" or "kill") to manually check a system log to find out exceptions. However, such exception detection is not suitable for large-scale log data systems, because the manual workload is too large. For a large number of log messages, an automatic log processing strategy may be used. Log messages are unstructured text and semi-structured data, and may be converted into structured data for further analysis.

Log parsing includes extracting structured or constant parts from log messages. The constant part is identified by a log event or a log template. For example, "CE sym 2, at 0x0b85eee0, mask 0x05" is a log message. The log event associated with the log message is "CE sym< >, at< >, mask< >." Although formatted, log events are still text data. Most machine learning algorithms for exception detection cannot directly process text data. Therefore, exporting the digital representation of log events or extracting the features thereof is a key step. Exception recognition may be carried out according to the results of feature extraction by using some machine learning models, e.g., regression, random forest, clustering, principal component analysis (PCA), and independent component analysis (ICA). First, some statistical features related to log events are retrieved, e.g., sequence, frequency, surge, seasonality, event ratio, mean interarrival time, average mean interarrival distance, propagation severity, and propagation time interval. Then, the log events are identified according to the statistical features.

Because the recognized log events and features are still text, direct processing of the text is not suitable for detecting large-scale log exceptions. In embodiments of the present disclosure, log events may be vectorized, e.g., log event vectors are constructed based on the frequency and weight of each term. Then, the message sequence of a log is constructed, and the log event vector is converted into a log sequence vector as the input of the subsequent training model. That is, before a real log and a pseudo-log are identified, the term vectors in the logs are converted into log event vectors first, and then the log event vectors are converted into log sequence vectors. Therefore, the number of log events is far smaller than the number of terms. The length of a vector is determined by the number of terms or log events. The dimension of the vector is reduced, which further reduces the calculation cost. The reasoning and feature extraction process becomes more effective due to fewer parameters.

In some embodiments, log parsing is extracted from an original log, a log template, or a log event. A log template is a log event that records events related to system execution. For example, as a log template, FT-tree detects the longest combination of frequently occurring terms. After the original log is separated into constant and variable logs using hierarchical clustering, the same log events are put into the same clustering group.

Figure 7:
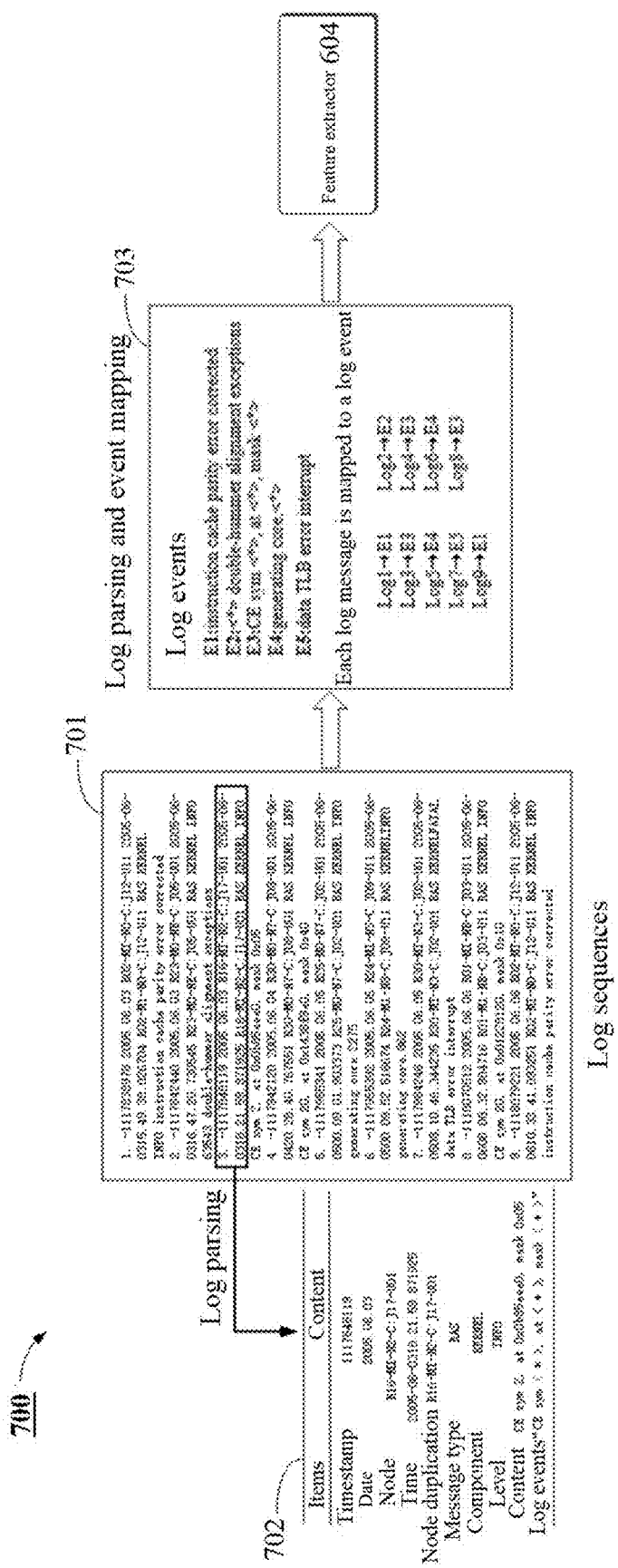
FIG. 7 shows a schematic diagram of a log parsing process according to some embodiments of the present disclosure.

FIG. 7 shows schematic diagram 700 of a process of log parser 603 parsing log data. As shown in FIG. 7, block 701 contains log data, including 9 original log messages, and each log message may contain timestamp, date, node, time, node duplication, message type, component (message generation location), level, content, and the like. For example, the third log message is "–1117848119 2005.06.03 R16-MI-N2-C:J17-U01 20May 6, 0318.21.59.871925 R16-MI-N2-C:J17-U01 RAS KERNEL INFO CE sym 2, at 0x0b85eee0, mask 0x05," wherein 1117848119 is timestamp, 2005.06.03 is date, R16-M1-N2-C:J17-U01 is node, 20May 6, 2003-18.21.859.871925 is time, R16-M1-N2-C:J17-U01 is node duplication, RAS is message type, KERNEL is component, INFO is level, and CE sym 2, at 0x0b85eee0, mask 0x05 is content. After the log message is parsed, the representation in block 702 may be referred to. The log event is displayed in the last line of block 702, that is, "CE sym <*>, at <*>, mask <*>". The semi-structured original log message is converted into structured information. The variable part in the log message is replaced with a wildcard character, and the constant part remains unchanged. Each log event has a unique log event and a unique event template. The event template of the third log message is "CE sym< >, at< >, mask< >" and corresponds to log event E3. In the example in FIG. 7, in block 703, 5 log events E1, E2, E3, E4, and E5 may be obtained from 9 original log messages in block 701. Each original log message may be mapped to a log event. For example, the first log information is mapped to log event E1, the second log information is mapped to log event E2, and so on. The algorithm for parsing logs is not limited in embodiments of the present disclosure. In one example, log parsing may be performed by a Drain algorithm for online log parsing based on a fixed depth tree.

In order to obtain a log sequence vector, a log event vector may be obtained via pre-training first, and then a log event is represented with the log event vector. A log sequence matrix is generated from the log event by feature extractor 604.

In combination with FIG. 8, a process of feature extractor 604 performing feature extraction on log data is described below. In combination with the previous embodiments, in some embodiments, the feature matrix of a log sequence is determined based on the event vector and the log sequence. Specifically, the event vector in the log sequence is weighted and averaged to obtain the feature matrix. In combination with the previous embodiments, in some embodiments, the weight of the event vector depends on the frequency of occurrence of the event type of the corresponding log.

Figure 8:
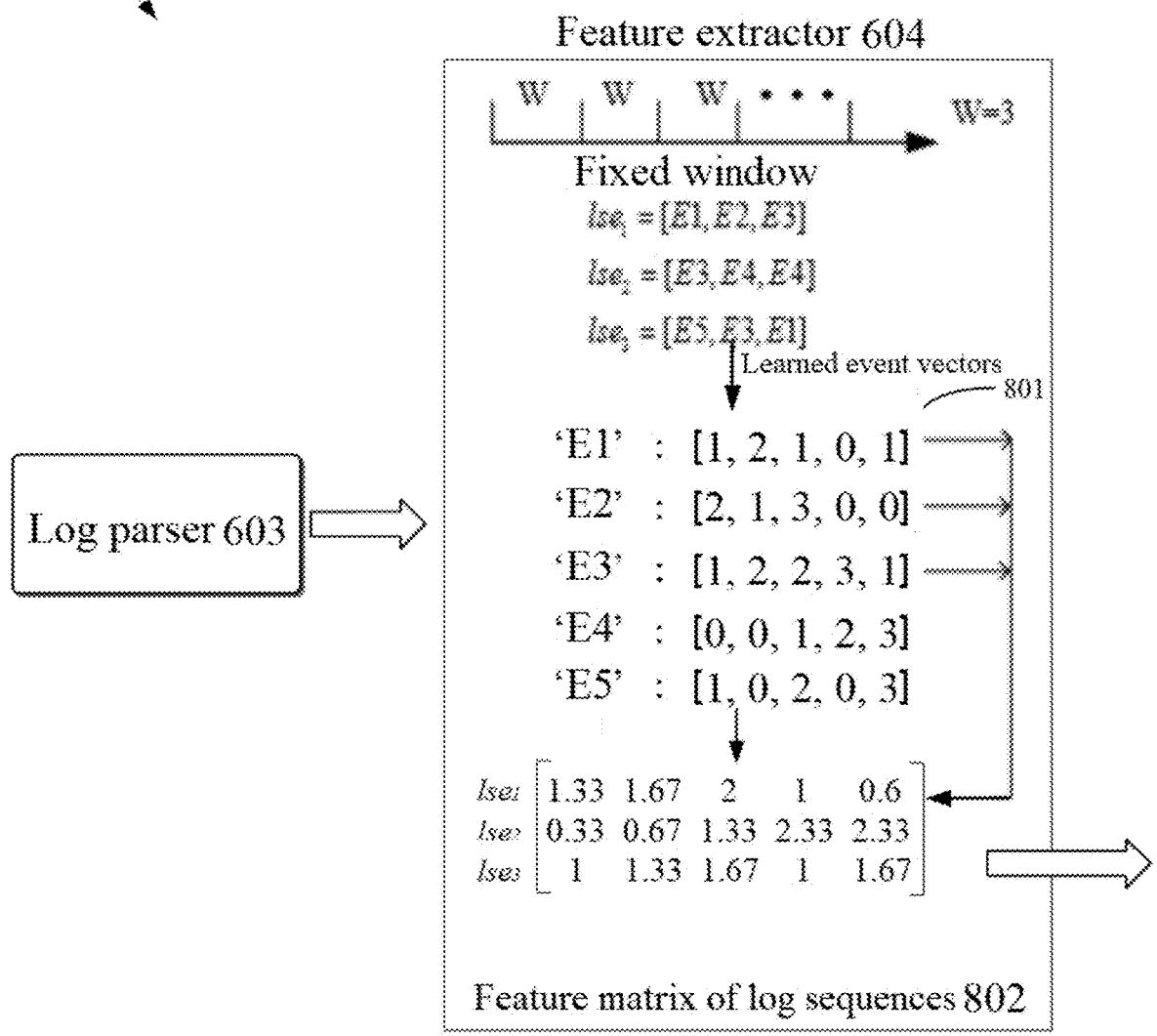
FIG. 8 shows a schematic diagram of a log feature extraction process according to some embodiments of the present disclosure.

FIG. 8 shows schematic diagram 800 of a process of feature extractor 604 generating a log sequence feature matrix based on a log vector. A plurality of log messages are divided into a plurality of log sequences with a fixed window. For example, as shown in FIG. 8, the 9 log messages in FIG. 7 are divided into sequence 1 $lse_1$=[E1, E2, E3], sequence 2 $lse_2$=[E3, E4, E4], and sequence 3 $lse_3$=[E5, E3, E1], the window size being 3. Each event vector is one-hot encoded, and then learned according to the divided sequence to obtain learned event vectors 801. Then, according to learned event vectors 801 and the log sequences, feature matrix 802 of the log sequences is obtained as the input of the subsequent training model. For the process of learning the learned event vectors 801, refer to the embodiment as described in FIG. 9.

In some embodiments, learned event vectors 801 may be converted into feature matrix 802 of the log sequences through the Bary algorithm or the term frequency-inverse document frequency (TF-IDF) algorithm. In some examples, the vector of a log sequence may be defined as the mean value of all log events thereof by the Bary algorithm, as shown in Equation (3):

$$f(lse_i) = def 1/|lse_i| \sum_{k=1}^{k=W} v(p(l_{iW+k})), lse_i \in LSE \quad (3)$$

In other examples, the vector of a log sequence may be defined as the weighted average of all log events thereof by the TF-IDF algorithm, and the weight depends on the frequencies of the log events, e.g., the weight of rare log events is higher than that of frequent log events.

In an example, according to the Bary algorithm, the vector of the first log sequence $lse_1$ is the average value of event vectors E1, E2, and E3, that is, $lse_1$=([1,2,1,0,1]+[2,3,0,0]+ [1,2,2,3,1])/3=[1.33,1.67,2,1,0.6]. Similarly, the vectors of $lse_2$ and $lse_3$ are also calculated in this way, i.e., $lse_2$=[0.33, 0.67, 1.33,2.33,2.33], $lse_3$=[1,1.33,1.67,1, 1.67], as shown in FIG. 8. After the above transformation, vectors of all log sequences may be obtained as a N/W×dim(T) matrix, N being the number of logs, W being the window size, and dim (T) being the dimension of vector space T and being 5 in this example.

Figure 9:
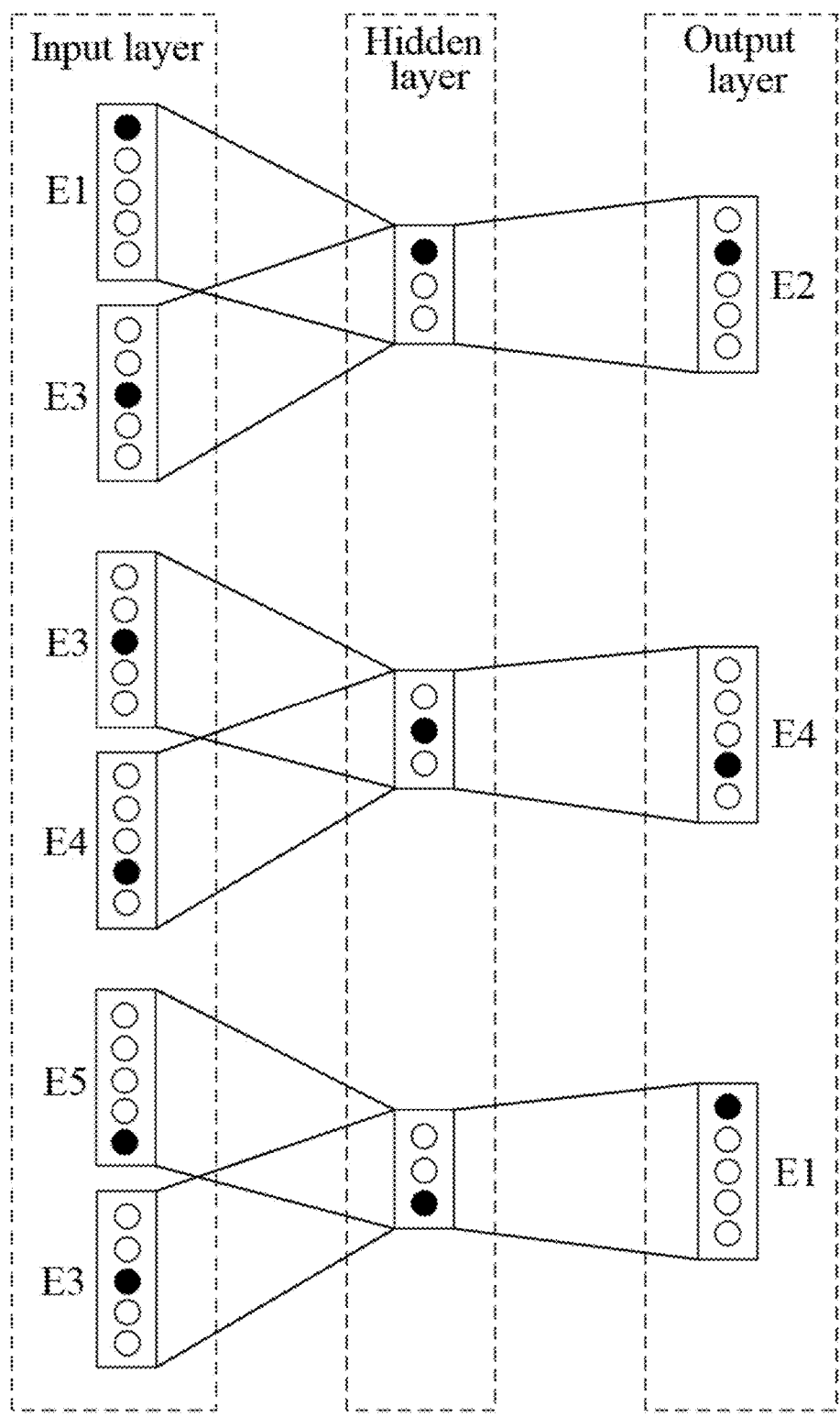
FIG. 9 shows a schematic diagram of a pre-training strategy of event vectors according to some embodiments of the present disclosure.

Referring to FIG. 9, schematic diagram 900 of a pre-training strategy of event vectors is shown. In combination with the previous embodiments, in some embodiments, each event type may be represented with a one-hot code. Then, an event vector is obtained based on the one-hot code and the log sequence of the event type. The feature matrix of the log sequence is determined based on the event vector and the log sequence.

In some implementations, log events may be trained as term vectors to obtain log event vectors. For example, in some embodiments, the target term of a log sequence may be selected, the context term vector of the target term is used as the training input, and the target term vector is used as the training output. Or, in other embodiments, the term vector of a target term may also be inputted, and the context term vector of the target term may be outputted. The training method is not limited in this embodiment. Generally, a training model includes at least an input layer, a hidden layer, and an output layer.

As illustrated in FIG. 9, log events E1 to E5 may be first represented with one-hot codes for training. Here, considering that there are five event vectors, the one-hot codes may be represented by a five-dimensional vector, i.e., |E|=5. In the example in FIG. 9, assuming the fixed window size is 3, 9 log messages are divided into three sequences ($lse_1$, $lse_2$, $lse_3$): [E1, E2, E3], [E3, E4, E4], [E5, E3, E1]. The intermediate term in each log sequence is used as the target term, the context term vector is used as the training input, and the target term vector is used as the training output. That is, log events E1 and E3 in $lse_1$ are used as inputs, and log event E2 is used as output; log events E3 and E4 in $lse_2$ are used as input, and log event E4 is used as output; and log events E5 and E3 in $lse_3$ are used as input, and log event E1 is used as output. The size of the hidden layer is blurred. After the model is trained, the embedded vector of the log event may be obtained by multiplying the one-hot vector of the log event with a corresponding weight matrix. In this example, assuming the dimension is set to 5, the finally obtained embedded vectors of log events E1 to E5 after training are [1,2,1,0,1], [2,1,3,0,0], [1,2,2,3,1], [0,0,1,2,3], and [1,0,2,0, 3], i.e., learned event vectors 801 as shown in FIG. 8.

According to embodiments of the present disclosure as described above and in combination with such embodiments, the accuracy of a training model for generating pseudo-logs that are sufficiently real may be improved, and then the log volume under specified conditions may be rapidly expanded by use of the model.

It should be understood that the implementations illustrated in FIG. 3 to FIG. 9 above are only schematic. According to the actual application, the architectures or processes illustrated in FIG. 3 to FIG. 9 may have other different forms, and may also include more or fewer functional modules and/or units, which may be partially or completely implemented as hardware modules, software modules, firmware modules, or any combination thereof, which is not limited in embodiments of the present disclosure.

Figure 10:
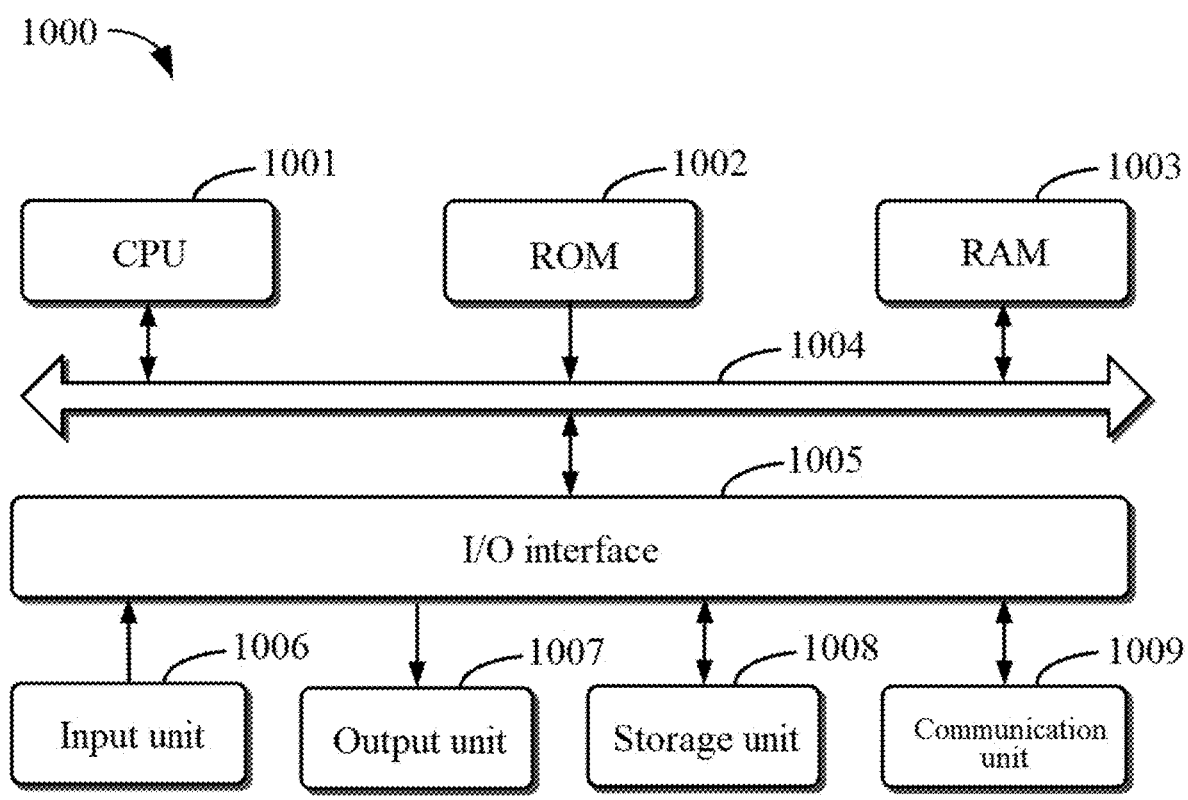
FIG. 10 shows a schematic structural diagram of a device that can be configured to implement embodiments of the present disclosure.

FIG. 10 shows a schematic structural diagram of example device 1000 that may be used for implementing some embodiments according to the present disclosure. Device 1000 may be implemented as a server or a PC, and the specific implementation type of device 1000 is not limited in embodiments of the present disclosure. As shown in FIG. 10, device 1000 includes central processing unit (CPU) 1001 that may perform various appropriate actions and processing according to computer program instructions stored in read-only memory (ROM) 1002 or computer program instructions loaded from storage unit 1008 to random access memory (RAM) 1003. Various programs and data required for the operation of device 1000 may also be stored in RAM 1003. CPU 1001, ROM 1002, and RAM 1003 are connected to one other through bus 1004. Input/output (I/O) interface 1005 is also connected to bus 1004.

A plurality of components in device 1000 are connected to I/O interface 1005, including: input unit 1006, e.g., a keyboard and a mouse; output unit 1007, e.g., various types of displays and speakers; storage unit 1008, e.g., a magnetic disk and an optical disc; and communication unit 1009, e.g., a network card, a modem, and a wireless communication transceiver. Communication unit 1009 allows device 1000 to exchange information/data with other devices via a computer network, e.g., the Internet, and/or various telecommunication networks.

CPU 1001 may execute the methods and/or processing as described above, e.g., method 200. For example, in some embodiments, method 200 may be implemented as a computer software program that is tangibly included in a machine-readable medium, e.g., storage unit 1008. In some embodiments, part or all of the computer program may be loaded and/or installed to device 1000 via ROM 1002 and/or communication unit 1009. When the computer program is loaded to RAM 1003 and executed by CPU 1001, one or more steps of method 200 as described above may be performed. Alternatively, in other embodiments, CPU 1001 may be configured to perform method 200 in any other appropriate manners (e.g., by means of firmware).

The functions as described herein may be performed, at least in part, by one or a plurality of hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

In some embodiments, the methods and processes as described above may be implemented as a computer program product. The computer program product may include a computer-readable storage medium on which computer-readable program instructions for performing various aspects of the present disclosure are loaded.

Program code for implementing the method of the present disclosure may be written in one or any combination of more programming languages. The program code may be provided to a processor or controller of a general-purpose computer, a special-purpose computer, or other programmable data processing apparatuses, such that the program code, when executed by the processor or controller, implements the functions/operations as specified in a flow chart and/or block diagram. The program code may be executed completely on a machine, executed partially on a machine, executed partially on a machine and partially on a remote machine as a stand-alone software package, or executed completely on a remote machine or server.

The computer-readable program instructions as described herein may be downloaded from a computer-readable storage medium to various computing/processing devices, or downloaded to an external computer or external storage device via a network, e.g., the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in one or any combination of more programming languages, including object-oriented programming languages and conventional procedural programming languages. The computer-readable program instructions may be executed completely on a user computer, executed partially on a user computer, executed as a stand-alone software package, executed partially on a user computer and partially on a remote computer, or executed completely on a remote computer or server.

These computer-readable program instructions may be provided to a processing unit of a general-purpose computer, a special-purpose computer, or other programmable data processing apparatuses to produce a machine, such that these instructions, when executed by the processing unit of the computer or the programmable data processing apparatuses, produce an apparatus for implementing the functions/actions as specified in one or more blocks in a flow chart and/or block diagram. These computer-readable program instructions may also be stored in a computer-readable storage medium, and cause a computer, a programmable data processing apparatus, and/or other devices to operate in a specific manner, such that the computer-readable medium having instructions stored includes an article of manufacture that includes instructions for implementing various aspects of the functions/actions as specified in one or more blocks in a flow chart and/or block diagram. The computer-readable program instructions may also be loaded to a computer, other programmable data processing apparatuses, or other devices, such that a series of operating steps may be performed on the computer, the programmable data processing apparatuses, or the devices to produce a computer-implemented process, and further the instructions executed on the computer, the programmable data processing apparatuses, or the devices may implement the functions/actions as specified in one or more blocks in a flow chart and/or block diagram.

In the context of the present disclosure, a machine-readable medium may be a tangible medium that may include or store a program for use by an instruction execution system, apparatus, or device, or for use in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any appropriate combination of the above. More specific examples of the machine-readable storage medium may include one or more wire-based electrical connections, portable computer diskettes, hard disks, random access memories (RAMs), read-only memories (ROMs), erasable programmable read-only memories (EPROMs or flash memories), optical fibers, portable compact disk read-only memories (CD-ROMs), optical storage devices, magnetic storage devices, or any appropriate combinations thereof.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two consecutive blocks may in fact be executed substantially in parallel, and sometimes may also be executed in a reverse order, depending on the functions involved. It should be further noted that each block in the block diagrams and/or flow charts as well as a combination of blocks in the block diagrams and/or flow charts may be implemented using a special-purpose hardware-based system that executes specified functions or actions, or using a combination of special-purpose hardware and computer instructions.

Additionally, although operations are depicted in a particular order, this should be understood that such operations are required to be performed in the particular order shown or in a sequential order, or that all illustrated operations are required to be performed to achieve desirable results. Under certain environments, multitasking and parallel processing may be advantageous.

Likewise, although the above discussion contains several specific implementation details, they should not be construed as limitations to the scope of the present disclosure. Certain features as described in the context of separate embodiments may also be implemented in combination in one implementation. Conversely, various features as described in the context of one implementation may also be implemented in a plurality of implementations separately or in any appropriate sub-combination.

Although the present subject matter has been described using a language specific to structural features and/or methodological logic actions, it should be understood that the subject matter defined in the appended claims is not necessarily limited to the particular features or actions as described above. Rather, the specific features and actions as described above are merely example forms for implementing the claims.

Illustrative embodiments of the present disclosure have been described above. The foregoing description is illustrative rather than exhaustive, and is not limited to the embodiments disclosed. Numerous modifications and alterations will be apparent to those of ordinary skill in the art without departing from the scope and spirit of the illustrated embodiments. The terms as used herein are selected to best explain the principles and practical application of the embodiments and their associated improvements, so as to enable those of ordinary skill in the art to understand the embodiments disclosed herein.

What is claimed is:

1. A method for generating logs, the method comprising:
generating, by a generator of a machine learning system comprising the generator and a discriminator, a pseudo-log based on a generating condition and random noise, the generator and the discriminator collectively comprising a generative adversarial network of the machine learning system;
determining, by the discriminator, event types of log messages in a real log and the pseudo-log;
determining, by the discriminator, a feature matrix of log sequences in the real log and the pseudo-log based on the event types;
determining, by the discriminator, authenticity of the real log and the pseudo-log based on the feature matrix; and
training the generator and the discriminator based on the authenticity, wherein the generator is trained at least in part while fixing the discriminator under a first set of one or more conditions, and the discriminator is trained at least in part while fixing the generator under a second set of one or more conditions.

2. The method according to claim 1, further comprising:
parsing each log message, by the discriminator, to obtain the event type corresponding to each log message; and
mapping each log message, by the discriminator, to the corresponding event type thereof.

3. The method according to claim 2, further comprising:
constructing, by the discriminator, the log sequences according to the event types corresponding to a plurality of log messages and a preset window; and
determining the feature matrix of the log sequences according to the log sequences.

4. The method according to claim 3, further comprising:
representing each event type with a one-hot code;
obtaining an event vector based on the one-hot code and the log sequence of the event type; and
determining the feature matrix of the log sequence based on the event vector and the log sequence.

5. The method according to claim 4, wherein determining the feature matrix of the log sequence based on the event vector and the log sequence comprises:
weighting the event vector in the log sequence and averaging the event vector in the log sequence, to obtain the feature matrix, wherein weighting the event vector comprises applying a weight of the event vector to the event vector.

6. The method according to claim 5, wherein the weight of the event vector depends on a frequency of occurrence of the event type of the corresponding log.

7. The method according to claim 1, wherein training the generator and the discriminator comprises:
fixing the discriminator and training the generator based on the random noise and the generating condition;
generating, by the trained generator, the pseudo-log according to the random noise and the generating condition;
inputting the pseudo-log generated by the generator into the discriminator; and
fixing the generator and training the discriminator based on the pseudo-log, the real log and the generating condition.

8. The method according to claim 7, wherein the training further comprises:
outputting, by the discriminator, a discrimination probability based on judging whether the inputted pseudo-log is a real log corresponding to the generating condition;
obtaining a loss according to the discrimination probability; and
adjusting the discriminator and/or the generator according to the loss.

9. The method according to claim 8, further comprising:
in a case that the discrimination probability meets a predetermined value, stopping the training, wherein in a case that the predetermined value is 0.5, it is indicated that the discriminator cannot distinguish the authenticity of the pseudo-log generated by the generator and the real log.

10. The method according to claim 1, further comprising:
inputting a target condition and random noise into the trained generator; and
generating, by the trained generator, a log corresponding to the target condition.

11. An electronic device, comprising:
at least one processor; and
memory coupled to the at least one processor and having instructions stored therein, wherein the instructions, when executed by the at least one processor, cause the electronic device to perform operations comprising:
generating, by a generator of a machine learning system comprising the generator and a discriminator, a pseudo-log based on a generating condition and random noise, the generator and the discriminator collectively comprising a generative adversarial network of the machine learning system;
determining, by the discriminator, event types of log messages in a real log and the pseudo-log;
determining, by the discriminator, a feature matrix of log sequences in the real log and the pseudo-log based on the event types;
determining, by the discriminator, authenticity of the real log and the pseudo-log based on the feature matrix; and
training the generator and the discriminator based on the authenticity, wherein the generator is trained at least in part while fixing the discriminator under a first set of one or more conditions, and the discriminator is trained at least in part while fixing the generator under a second set of one or more conditions.

12. The electronic device according to claim 11, wherein the operations further comprise:
parsing each log message, by the discriminator, to obtain the event type corresponding to each log message; and mapping each log message, by the discriminator, to the corresponding event type thereof.

13. The electronic device according to claim 12, wherein the operations further comprise:
constructing, by the discriminator, the log sequences according to the event types corresponding to a plurality of log messages and a preset window; and
determining the feature matrix of the log sequences according to the log sequences.

14. The electronic device according to claim 13, wherein the operations further comprise:
representing each event type with a one-hot code;
obtaining an event vector based on the one-hot code and the log sequence of the event type; and
determining the feature matrix of the log sequence based on the event vector and the log sequence.

15. The electronic device according to claim 14, wherein the operation of determining the feature matrix of the log sequence based on the event vector and the log sequence comprises:
weighting the event vector in the log sequence and averaging the event vector in the log sequence, to obtain the feature matrix, wherein weighting the event vector comprises applying a weight of the event vector to the event vector.

16. The electronic device according to claim 15, wherein the weight of the event vector depends on a frequency of occurrence of the event type of the corresponding log.

17. The electronic device according to claim 11, wherein the operation of training the generator and the discriminator comprises:
fixing the discriminator and training the generator based on the random noise and the generating condition;
generating, by the trained generator, the pseudo-log according to the random noise and the generating condition;
inputting the pseudo-log generated by the generator into the discriminator; and
fixing the generator and training the discriminator based on the pseudo-log, the real log and the generating condition.

18. The electronic device according to claim 17, wherein the operation of training further comprise:
outputting, by the discriminator, a discrimination probability based on judging whether the inputted pseudo-log is a real log corresponding to the generating condition;
obtaining a loss according to the discrimination probability; and
adjusting the discriminator and/or the generator according to the loss.

19. The electronic device according to claim 18, wherein the operations further comprise:
in a case that the discrimination probability meets a predetermined value, stopping the training, wherein in a case that the predetermined value is 0.5, it is indicated that the discriminator cannot distinguish the authenticity of the pseudo-log generated by the generator and the real log.

20. A computer program product that is tangibly stored on a non-transitory computer-readable medium and comprises machine-executable instructions, wherein the machine-executable instructions, when executed by a machine, cause the machine to perform operations comprising:
generating, by a generator of a machine learning system comprising the generator and a discriminator, a pseudo-log based on a generating condition and random noise, the generator and the discriminator collectively comprising a generative adversarial network of the machine learning system;
determining, by the discriminator, event types of log messages in a real log and the pseudo-log;
determining, by the discriminator, a feature matrix of log sequences in the real log and the pseudo-log based on the event types;
determining, by the discriminator, authenticity of the real log and the pseudo-log based on the feature matrix; and
training the generator and the discriminator based on the authenticity, wherein the generator is trained at least in part while fixing the discriminator under a first set of one or more conditions, and the discriminator is trained at least in part while fixing the generator under a second set of one or more conditions.

\* \* \* \* \*